United States Patent Office 3,029,428
Patented Apr. 10, 1962

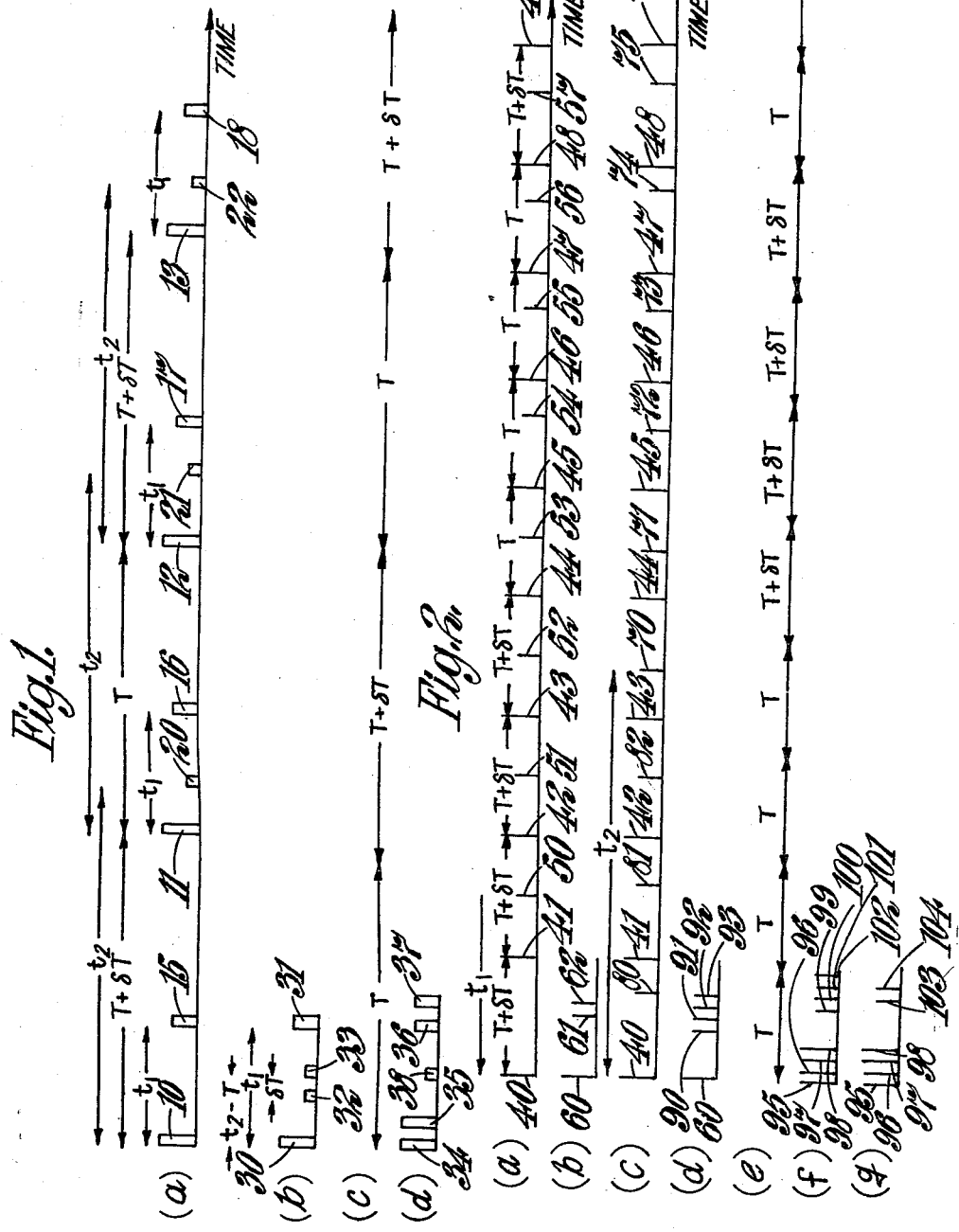

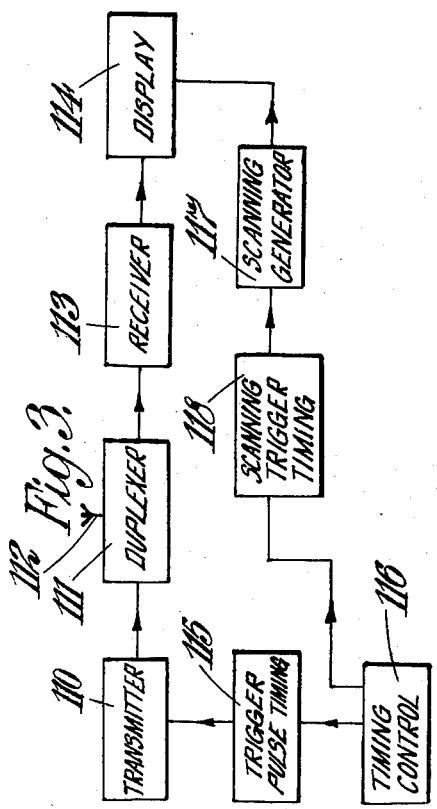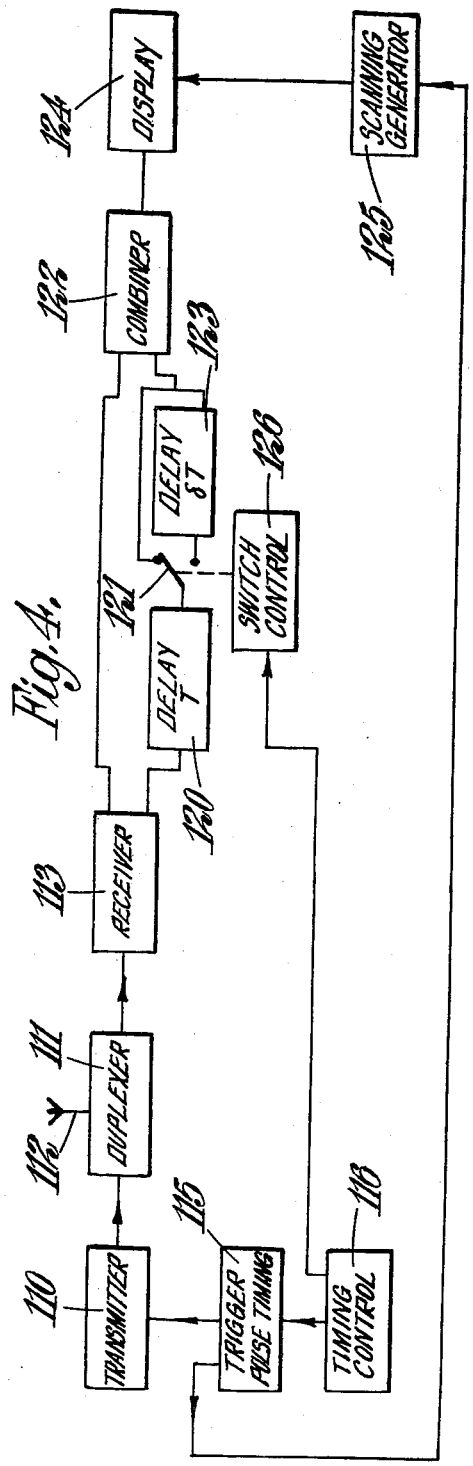

3,029,428
PULSE RADAR APPARATUS
Robert Matthews, London, England, assignor to The Decca Record Company Limited, London, England, a British company
Filed July 1, 1957, Ser. No. 669,146
Claims priority, application Great Britain July 2, 1956
11 Claims. (Cl. 343—13)

Heretofore one of the limitations on the maximum range of detection of pulse radar apparatus has usually been the shortness of the pulse repetition period. In radar apparatus employing a scanning directional antenna, high scanning rates and narrow antenna beam widths are desirable and it is necessary, for a given beam width and scanning rate, to have a certain minimum pulse repetition rate to avoid missing targets. It has long been known that if a response is obtained from a target at a greater range than that corresponding to the pulse repetition period, such a response may appear on the display at a position which is dependent not only on the range of the echo but also on the pulse repetition period. Such echoes, which are known as "second returns," however, have not been of any practical value heretofore since with prior types of display, it has generally not been possible to identify them with certainty and thus it has not been possible to determine their range.

It is an object of the present invention to provide a pulse radar system in which use can be made of multiple returns for detecting targets at long ranges.

According to this invention, in pulse radar apparatus, the interval between successive transmitted pulses is systematically altered from one to another of two different values which differ by an amount greater than the duration of the transmitted pulses but small compared with the duration of the intervals.

In the simplest case, the intervals between the transmitted pulses are alternately of the two different durations. If the radar display time base is repetitive and synchronised to start with each transmitted pulse, all the response, including both first and second returns, will appear on each trace, but second returns will appear at different points on alternate traces so giving the appearance of two echoes at different ranges on the display, whereas first returns only give a single response. Thus the operator may readily distinguish between first and second returns. The display may be of any type having a time base trace, such as for example an A-scope or B-scope or a P.P.I. display. In an A-scope display the two echoes will appear side by side. In a B-scope or P.P.I. display, the successive time base traces are displaced one another since the trace is swept transversely or angularly in synchronism with the aerial scanning and in such arrangements the echoes will appear on alternate traces at different ranges as the radar beam sweeps across the target.

For measuring the range of responses, a conventional type of strobe or calibrator circuit might be used, the range of second return responses being obtained merely by adding on a constant dependent on the pulse repetition rate. Alternatively, calibrator marks may be provided, these marks occurring repetitively for sufficient time to appear on two successive traces so as to show as two responses for ranges corresponding to second returns. Another method of measuring ranges of second return signals is by using a strobe circuit which is triggered on every second pulse, the strobe circuit having sufficient adjustment to enable it to appear on either first or second traces of each pair of successive traces.

In the arrangement having alternative intervals of two different durations described above, it will be seen that the first return echoes will paint on the display screen in the same place on each trace, whereas alternate second return echoes paint in different positions. The second return echoes will generally be of smaller amplitude than the first return echoes, and it may be undesirable for second return echoes to lose the integrating factor due to repetitive painting on the same point of the display screen. For this reason, where the transmitted pulses are radiated with alternate intervals of two different durations, the time base of the display screen may similarly be alternately of these two different durations, but with the longer duration time base started in synchronism with that transmitted pulse which occurs at the commencement of the shorter transmitted pulse intervals or vice versa. By ths system the first return echoes will appear as two responses on the display whilst second return echoes will appear as single responses.

In the description above, reference has been made more particularly to first and second returns. In some cases it may be desirable to make use of third or further multiple returns and more generally the pulse radar apparatus may be arranged so that the pulses are transmitted with $n$ successive intervals of one duration follow by $n$ successive intervals of the other duration, where $n$ is an integral whole number If the display time bases are triggered to start at the same time as the transmitted pulses, then the first return echoes will paint as single responses on the display, the second return echoes will paint as two responses on the display and so on until the $n$th return echoes which will paint as $n$ responses on the display. The $(n+1)$th return will paint with $n+1$ responses and further returns would paint on the display a number of times in inverse up to the $(2n+1)$th return which will paint only once. Thus, in one arrangement, there is provided a radio frequency pulse transmitter arranged to radiate short duration pulses with intervals between pulses, the intervals between successive pulses being systematically altered from one to another of two different values which differ by an amount greater than the duration of the transmitted pulses but small compared with the duration of the intervals and a receiver having a display with a repetitive time base which is synchronised to start with each transmitted pulse.

As in the previously described arrangement with long and short intervals alternating, the sequence of long and short intervals for the transmitter pulses and the display time bases may be in opposite phase, that is to say for example, the transmitted pulses might have four long intervals followed by four short intervals, whilst the display has four short intervals followed by four long intervals. In that case the fourth returns would paint as single responses on the display, the third return echoes would paint as two responses, the second return echoes would paint as three responses and the first return echoes would paint as four responses. More generally, if the pulses are transmitted with $n$ successive intervals of one duration followed by $n$ successive intervals of the other duration, a receiver may be provided with a repetitive time base display of similar durations in a simlar sequence, the first short duration time base of each succession of $n$ short duration time bases being synchronised to start with the transmitted pulse at the commencement of the first long interval between transmitted pulses in each sequence of $n$ transmitted pulses. The first returns will then paint as $n+1$ responses, the second returns as $n$ responses and so on.

Ground returns in any of the arrangements so far described above would appear on every trace and hence would tend to obscure echoes on distant targets on second or further returns. Preferably therefore some means are provided for cancelling out the first returns. In one arrangement for this purpose, the transmitter pulse intervals and the time base durations are synchronised, that is to say the short time base durations coincide with the short intervals between the transmitted pulses and there are provided two delay lines, one having a delay time equal to the short interval and the other having a delay time equal to the difference in the two intervals. The received signals are fed through either the first delay line or the two delay lines in series, according to the duration of the display time bases (by switch means locked to the pulse repetition rate generator), and then combined with the directly received signals so as to cancel out corresponding signals. This will cancel out any responses, such as first returns, which paint only as single responses on the display but will permit the showing of signals which appear at different positions on successive traces. The responses from second or further return echoes would still be identifiable in the same way as before by counting the number of responses shown on the screen.

In the following description reference will be made to the accompanying drawings in which:

FIGURES 1 and 2 are graphical diagrams showing the times at which pulses are transmitted and echoes received; and FIGURES 3 and 4 are block diagrams illustrating two forms of radar apparatus embodying the invention.

FIGURE 1($a$) is a graphical diagram having a time axis extending horizontally and showing at 10, 11, 12, 13 a sequence of transmitted pulses in which the time intervals between the successive pulses are alternately $T+\Delta T$ and T. The difference of the time intervals $\Delta T$ is made greater than the pulse duration but small compared with T. If an echo from a target is returned at a time interval $t_1$ (less than T) after the transmitted pulses, such a return echo would occur at the times indicated by the pulses 15, 16, 17, 18 in FIGURE 1($a$). A pulse echo received from the target at a greater range than that corresponding to the pulse repetition period, that is to say at a time interval $t_2$ after the transmitted pulse where $t_2$ is greater than T, will occur at the times indicated, for example, by the pulses 20, 21, 22 which are echoes of the transmitted pulses 10, 11 and 12 respectively. The appearance of a radar display trace having a time base synchronised to start with each transmitted pulse and displaying the echo signals shown in FIGURE 1($a$) is illustrated in FIGURE 1($b$). The transmitted pulses all occur as the response 30 at the commencement of the receiver time base and an echo response 31 corresponding to the echo signals 15, 16, 17, 18 occurs at a distance along the time base corresponding to the time $t_1$. It will be seen by examination of FIGURE 1($a$) that the second return signals 20, 21, 22 will give responses alternately at two positions 32, 33 on the receiver time base, the time interval between these two positions being $\Delta t$. Thus, in this simple system, first return echoes will appear as a single pulse response on the receiver display time base, whereas second return echoes will appear as two pulse responses. The true ranges of the targets indicated by the second return responses on the time base of FIGURE 1($b$) may be determined by measuring the apparent range of either the first or the second response (that is $t_2-T-\Delta T$ or $t_2-T$ respectively) and adding a constant range corresponding to $T+\Delta T$ for the first response or T for the second response.

Instead of synchronising the receiver time base so as always to start at the instant of the transmitted pulses, the short duration time bases may be synchronised to start with the transmitted pulses at the beginning of the longer interval between the transmitted pulses and alternated with the longer duration time bases as illustrated diagrammatically in FIGURE 1($c$). The resultant display is shown in FIGURE 1($d$) where two transmitted pulse responses 34, 35 occur spaced apart a distance corresponding to $\Delta T$. Similarly two first return responses 36, 37 occur for a single target but only a single second return response 38 occurs. It will be seen that a somewhat similar display with only a single second return response would be obtained if the longer duration time base was synchronised to start at the commencement of the shorter interval between the transmitted pulses but the response 38 would be at a different position on the display. Such arrangements in which the second return pulses appear as a single response may be of particular advantage if it is required to display only second return signals by cancelling out first return signals as can be done in the manner described below.

FIGURE 2 consists of a series of diagrams similar to FIGURE 1 in which, however, the transmitted pulses and echoes are illustrated as lines in order to make the diagrams clearer and in order to enable the scale of the diagrams to be reduced compared with FIGURE 1. Referring to FIGURE 2($a$) there are shown a series of transmitted pulses 40, 41, 42, 43, 44, 45, 46, 47, 48, 49 in which the first four intervals between the transmitted pulses are of duration $T+\Delta T$, and the next four intervals are of duration T. It is to be understood that after each such eight intervals the sequence is repeated. It will be immediately apparent that first return signals, if displayed on a receiver display having a time base synchronised to start with each transmitted pulse would appear as single responses in the normal way. In FIGURE 2($a$) there are illustrated second return echoes 50, 51, 52, 53, 54, 55, 56, 57 as echoes obtained by reflection from distant targets of the transmitted pulses 40 to 47 respectively, the echo signals occurring at time intervals $t_1$ after the transmitted pulses. FIGURE 2($b$) illustrates diagrammatically a receiver time base display in which the time base is started in synchronism with each transmitted pulse. The time base display will show the transmitted pulse at 60 and, for the second return echoes, will show two responses 61, 62. The reason for this, as may be seen by consideration of FIGURE 2($a$), is that the signals 50, 51, 52 and 53 occur at one particular time interval ($t_1-T-\Delta T$) after the immediately preceding transmitter pulses 41, 42, 43 and 44 respectively, whilst the signals 54, 55, 56 and 57 occur at a second longer time interval ($t_1-T$) after the immediately preceding transmitter pulses 45, 46, 47 and 48 respectively. The time interval between the responses 61, 62 on the receiver display is thus equal to $\Delta T$.

FIGURE 2($c$) is a diagram similar to FIGURE 2($a$) showing the same transmitted pulses 40 to 49 and also showing a series of fourth return signals occurring at time intervals $t_2$ after the transmitted pulses. Thus the signal 70 is an echo of the transmitted pulse 40, the signal 71 an echo from the pulse 41, signal 72 an echo from the pulse 42 and so on. In addition, for completeness in this diagram, the fourth return echoes 80, 81 and 82 are shown occurring from transmitted pulses which were sent out before the pulse 40. FIGURE 2($d$) illustrates a receiver time base display in which, as in FIGURE 2($b$), the receiver time base is synchronised to start with each transmitted pulse. In FIGURE 2($d$), as in FIGURE 2($b$), the transmitted pulses appear at 60 at the start of the display time base. It will be seen from FIGURE 2($c$) that the echoes 70, 71 occur at the same short interval after the immediately preceding transmitter pulses 43, 44 and these echoes will, therefore, appear as responses on the receiver display at 90. The echoes 72 and 82 appear at a slightly longer time interval after their immediately preceding transmitted pulses 45, 42 respectively and will therefore appear as responses at 91 on the display. The echoes 73 and 81 appear at a still longer time interval after the immediately preceding transmitted pulses 40 and 41 respectively and will appear as responses at 92 on the display. The echoes 74, 75 and 80 will appear at a still longer time interval after the immediately preceding transmitted pulses 47, 48 and 40 respectively and, therefore, appear as responses at 93 on the display.

FIGURE 2($c$) between the pulses 40 and 48 illustrates a complete cycle which is repetitive and therefore these four responses 90, 91, 92, 93 on the display are the only responses which will appear on the display from the fourth return echoes from a single target. It will thus be seen that, with the transmitted pulse sequence illustrated in FIGURES 2(a) and 2(c), second return signals will give two responses on the display, whilst fourth return signals will give four responses on the display. In a similar manner, it can readily be shown that third return responses each give three signals on the display.

More generally, if the pulses are transmitted with $n$ successive intervals of one duration followed by $n$ successive intervals of the other duration where $n$ is an integral whole number greater than unity, if the display time bases are triggered to start at the same time as the transmitted pulses, then the first return echoes will appear as single responses on the display, second return echoes will appear as two responses on the display and so on until the $n$th return signals which will appear as $n$ responses on the display. The $(n+1)$th return signals will appear as $(n+1)$ responses, the $(n+2)$th return will appear as $n$ responses and further returns would appear on the display a number of times in inverse order up to the $(2n+1)$th return which will appear only once.

FIGURE 2(e) illustrates a receiver time base sequence which is the inverse of the transmitter sequence employed in FIGURES 2(a) and 2(c). In FIGURE 2(e) there are four short period time bases of duration $T$ followed by four long period time bases of duration $T+\delta T$, the first short period time base occurring at the start of the first long interval between the transmitted pulses. If such a receiver display is employed, the signals represented in FIGURE 2(a) will appear on the display in the form shown in FIGURE 2(f) in which the transmitted pulses will appear as four responses 95, 96, 97, 98, whilst the received second return signals will appear as four responses 99, 100, 101, 102. The signals represented in FIGURE 2(c) will appear in the form shown in FIGURE 2(g) in which the transmitted pulses will appear as four responses at 95, 96, 97, 98 and the fourth return signals will appear as two responses 103, 104. With the receiver time base sequence indicated in FIGURE 2(e), the fifth return signals will appear as a single response.

The particular sequences of intervals between transmitted pulses and of durations of two bases in the display described with reference to FIGURES 1 and 2 are merely examples of possible combinations and, in practice, the particular sequences to be employed would have to be chosen in accordance with the circumstances, depending in particular on what multiple returns might be obtained, the number of targets and whether any particular targets, e.g. second return targets are to be specially displayed.

One form of pulse radar apparatus embodying the present invention is illustrated diagrammatically in FIGURE 3 in which there is shown a radio frequency pulse transmitter 110 coupled through a duplexed 111 to an aerial 112. In a typical case the transmitter 110 will operate to produce microwave frequency pulses and the aerial 112 will be a highly directional aerial which is continuously rotated or repetitively scanned over a sector. Signals received by the aerial 112, after passing through the duplexer 11, are fed to a receiver 113 to provide video output signals which are applied to modulate the cathode ray beam of a cathode ray tube display 114. The timing of the instants of transmission of the radio frequency pulses from the transmitter 110 is determined by a trigger pulse timing unit 115 under the control of a timing control unit 116. If sequences such as are illustrated in FIGURES 1 and 2 are to be employed, the intervals between successive trigger pulses are of two durations and the duration of these intervals is switched in a predetermined sequence. The unit 115 includes an electronic time delay circuit having a switchable component for altering the effective time delay and this time delay circuit might be arranged to control the time interval between the successive pulses.

The unit 116 is arranged to control the necessary switching of the time delay circuit. The cathode ray beam in the display 114 has to be scanned in an appropriate sequence. If the scanning time base is to be synchronised so as always to start with the transmitted pulses, a scanning time base generator might be triggered directly from the output of the trigger pulse timing unit 115 to provide scanning signals for deflecting the cathode ray beam. If, however, as in the arrangement of FIGURE 1(d) or FIGURE 2(e), the time bases of the display are to be in a sequence in opposite phase to the sequence of the transmitted pulse intervals, there may be provided a separate scanning trigger timing unit 118, which may be generally similar to the trigger pulse timing circuit 115, which scanning trigger timing unit is controlled from the timing control unit 116 so as to provide the necessary scanning generator trigger pulses in the required sequence.

FIGURE 4 illustrates an arrangement in which, as in FIGURE 3, there is provided a radio frequency pulse transmitter 110 which feeds radio frequency pulse signals through a duplexer 111 to a directional scanning aerial 112. The timing of the radio frequency pulses is effected by a trigger pulse timing unit 115 under the control of a timing control unit 116 so that the pulses are radiated with longer and shorter intervals between successive pulses in a predetermined sequence, for example the sequences of FIGURE 1 or FIGURE 2. Echo signals received by the aerial 112 are fed through the duplexer 111 to a receiver 113. Part of the video frequency output from the receiver 113 in the arrangement of FIGURE 4 is fed into a delay line 120 having a delay time $T$, that is to say equal to the shorter interval between the transmitted pulses. The output from the delay line 120 is fed to a switch 121 which switches this output either directly to a combiner 122 or into a second delay line 123 having a delay time $\delta T$ equal to the difference between the time intervals between the transmitted pulses. The output from the delay line 123, when the signals are fed into it, is fed into the combiner 122. The combiner 122 combines the output delayed by the delay line 120 or by the combined delay line 120 and 121 with signals received directly from the receiver 113, the signals being combined with opposite polarities so as to cancel out similar directly received and delayed signals if they arrive simultaneously at the combiner. The output from the combiner 122 is fed to a display 124 to modulate the beam of a cathode ray display tube. The cathode ray tube beam is scanned by scanning signals from a saw-tooth scanning signal generator 125, the start of each saw-tooth being triggered by the output from the trigger pulse timing circuit 115 so that the time bases start in synchronism with the transmitted pulses. The switch 121, which is preferably an electronic switch, is controlled by a switch control unit 126 so as to be operated in sequence with the switching of the transmitted pulse time intervals, the switching control unit 126 being controlled for this purpose by the timing control unit 116. The switch 121 is operated so that the effective delay time of the delayed signals fed into the combiner 122 is such as to cancel all first return signals. This will, therefore, ensure, inter alia, that all ground returns are cancelled from the display. The second and those subsequent return signals which, as explained with reference to FIGURES 1 and 2, would give multiple responses on the display time base would not be cancelled and they may be identified by counting the number of responses shown on the screen.

In the arrangement of FIGURE 4 it may be preferred to use the delay lines to determine the timing interval between the transmitter pulses. This may be done by passing a trigger pulse from the delay line output through a regenerator back to the delay line input so that the pulse is re-circulated with the appropriate time intervals. Thus any variation in the delay is automatically applied both to the transmitter pulse intervals and to the video intervals.

The display units of FIGURES 3 and 4 may employ either brightness or deflection modulated displays of any type having a time base so as to give a display showing the ranges of the various targets. It will be understood that the scanning generator units would have to be arranged to give the appropriate form of display required, for example, for a plan position display, either a saw-tooth current may be fed into a rotatable deflection coil rotated in synchronism with the rotary movement of the aerial or separate saw-tooth scanning signals may be fed to two sets of fixed deflector means arranged respectively for effecting deflection of the cathode ray beam in two directions at right angles.

For measuring the range of responses on the display, a conventional type of strobe or calibrator circuit (not shown) may be used, the range of second (or further) return responses being obtained by adding on a constant dependent on the interval between the transmitted pulses as previously explained. Alternatively, if only first and second returns are required, calibrator marks may be provided from a pulse generator having a constant repetition rate, these marks occurring repetitively for sufficient time to appear on two successive traces so as to show two responses for ranges corresponding to second returns. Such a calibrator mark generator might for example be triggered to start in synchronism with every alternate transmitted pulse.

I claim:

1. Pulse radar apparatus comprising a pulse transmitter arranged to transmit short duration radio frequency pulses at instants determined by applied control signals, receiving means including a cathode ray display tube with a repetitively scanned cathode ray beam modulated by received echoes of the transmitted signals, a timing control signal generator, means coupling said timing control signal generator to said transmitter to feed control signals to said transmitter in a sequence of $n$ intervals of a first duration and $n$ intervals of a second duration differing from the first duration by an amount greater than the duration of the transmitted pulses but small compared with the duration of said intervals where $n$ is an integral whole number, and means coupling said timing control signal generator to said receiving means to synchronize the scanning of the cathode ray beam in a similar sequence of $n$ scans of said first duration and $n$ scans of said second duration with the start of the first of the $n$ scans of one duration coinciding with the instant of transmitting the pulse at the beginning of the first of the $n$ intervals of one duration.

2. Pulse radar apparatus as claimed in claim 1 wherein $n$ is an integer between one and four.

3. Pulse radar apparatus comprising a pulse transmitter arranged to transmit short duration radio frequency pulses at instants determined by applied control signals, receiving means including a cathode ray display tube with a repetitively scanned cathode ray beam modulated by received echoes of the transmitted signals, a timing control signal generator, means coupling said timing control signal generator to said transmitter to feed control signals to said transmitter in a sequence of $n$ intervals of a first duration and $n$ intervals of a second duration differing from the first duration by an amount greater than the duration of the transmitted pulses but small compared with the duration of said intervals where $n$ is an integral whole number, and means coupling said timing control signal generator to said receiving means to synchronize the scanning of the cathode ray beam to provide one scan for each transmitted pulse, each scan starting at an instant coinciding with a transmitted pulse and extending until the next transmitted pulse.

4. Pulse radar apparatus comprising a pulse transmitter arranged to transmit short duration radio frequency pulses at instants determined by applied control signals, receiving means including a cathode ray display tube with a repetitively scanned cathode ray beam modulated by received echoes of the transmitted signals, a timing control signal generator, means coupling said timing control signal generator to said transmitter to feed control signals to said transmitter in a sequence of $n$ intervals of a first duration and $n$ intervals of a second duration differing from the first duration by an amount greater than the duration of the transmitted pulses but small compared with the duration of said intervals where $n$ is an integral whole number, and means coupling said timing control signal generator to said receiving means to synchronize the scanning of the cathode ray beam in a similar sequence of $n$ scans of said first duration and $n$ scans of said second duration with the start of the first of the $n$ scans of said first duration coinciding with the instant of transmitting the pulse at the beginning of the first of the $n$ intervals of said second duration.

5. Pulse radar apparatus as claimed in claim 4 wherein said timing control signal generator is arranged so that said first duration is shorter than said second duration.

6. Pulse radar apparatus comprising a pulse transmitter arranged to transmit short duration radio frequency pulses at instants determined by applied control signals, a timing control signal generator coupled to said transmitter to feed control signals thereto such that the intervals between the successive pulses are alternately of two different durations which differ by an amount greater than the duration of the transmitted pulses but small compared with the duration of the intervals, receiving means including a cathode ray display tube with a repetitively scanned cathode ray beam modulated by received echoes of the transmitted signals and synchronizing means arranged to synchronize the start of each display scan with a transmitted pulse with a scan for each transmitted pulse and extending for the whole period until the next transmitted pulse.

7. Pulse radar apparatus comprising a pulse transmitter arranged to transmit short duration radio frequency pulses at instants determined by applied control signals, a timing control signal generator coupled to said transmitter to feed control signals thereto such that the intervals between the successive pulses are alternately of first and second duration which differ by an amount greater than the duration of the transmitted pulses but small compared with the duration of said intervals, receiving means including a cathode ray display tube with repetitively scanned cathode ray beam modulated by received echoes of the transmitted signals, and synchronizing means for synchronizing the scanning of the cathode ray beam to have scans alternately of said first and said seond duration with scans of said first duration starting at the instant of transmitting the pulse at the beginning of the interval of said second duration.

8. Pulse radar apparatus as claimed in claim 7 wherein said timing control signal generator is arranged so that said first duration is shorter than said second duration.

9. Pulse radar apparatus comprising a pulse transmitter arranged to transmit short duration radio frequency pulses at instants determined by applied control signals, receiving means including a cathode ray display tube with a repetitively scanned cathode ray beam modulated by received echoes of the transmitted signals, a timing control signal generator, means coupling said timing control signal generator to said transmitter to feed control signals to said transmitter in a sequence of $n$ intervals of a first duration and $n$ intervals of a second duration differing from the first duration by an amount greater than the duration of the transmitted pulses but small compared with the duration of said intervals where $n$ is an integral whole number means coupling said timing control signal generator to said receiving means to synchronize the scanning of the cathode ray beam to provide a scan for each transmitted pulse each scan starting at an instant coinciding with a transmitted pulse and extending until the next transmitted pulse, switchable delay means synchronized with the scanning for delaying signals for said first or said second duration according as the scan is of said first or said second duration, circuit means for feeding received signals through said delay means, and combining means for combining the delayed signals passed through said delay means with undelayed signals in said receiving means so as to cancel undelayed signals occurring at the same time interval after the start of a scan as the corresponding delayed signals.

10. Pulse radar apparatus as claimed in claim 9 wherein said switchable delay means comprises a first delay line having a delay time equal to the shorter of the two scanning durations, a second delay line having a delay time equal to the difference of the two scanning durations and circuit means including switch means operated in accordance with the switching of the scanning duration arranged so that the signals to be delayed are fed either through said first delay line only or through the two delay lines in series.

11. In pulse radar apparatus having a pulse transmitter arranged to radiate short duration radio frequency pulses at instants determined by applied control signals, and receiving means including a cathode ray tube with a repetitively scanned cathode ray beam; a timing control signal generator arranged to control the intervals between the transmitted pulses in a sequence of intervals of two different durations comprising an integral number of intervals of one duration followed by an equal number of intervals of the other duration and means coupling said timing control signal generator to said receiving means to synchronize the scanning of the cathode ray beam to have scanning periods of said two different durations in the same sequence as the transmitted pulse intervals with the start of one scanning period in the sequence coinciding with the instant of transmission of one of the radiated pulses.

References Cited in the file of this patent
UNITED STATES PATENTS

| | | |
|---|---|---|
| 2,452,598 | Page | Nov. 2, 1948 |
| 2,741,762 | Page | Apr. 10, 1956 |
| 2,746,033 | Bachmann | May 15, 1956 |
| 2,774,965 | De Rosa | Dec. 18, 1956 |
| 2,840,808 | Woodward | June 24, 1958 |